(12) United States Patent
Garchery

(10) Patent No.: US 11,698,962 B2
(45) Date of Patent: Jul. 11, 2023

(54) METHOD FOR DETECTING INTRUSIONS IN AN AUDIT LOG

(71) Applicant: Atos Information Technology GmbH, Munich (DE)

(72) Inventor: Mathieu Garchery, Munich (DE)

(73) Assignee: BULL SAS, Les Clayes-sous-Bois (FR)

( * ) Notice: Subject to any disclaimer, the term of this patent is extended or adjusted under 35 U.S.C. 154(b) by 357 days.

(21) Appl. No.: 16/698,318

(22) Filed: Nov. 27, 2019

(65) Prior Publication Data

US 2020/0175158 A1 Jun. 4, 2020

(30) Foreign Application Priority Data

Nov. 29, 2018 (DE) ...................... 10 2018 130 306.8

(51) Int. Cl.
*G06F 21/55* (2013.01)
*G06N 20/20* (2019.01)

(52) U.S. Cl.
CPC .......... *G06F 21/552* (2013.01); *G06F 21/554* (2013.01); *G06N 20/20* (2019.01); *G06F 2221/034* (2013.01); *G06F 2221/2101* (2013.01)

(58) Field of Classification Search
CPC ...... G06F 21/552; G06F 21/554; G06F 21/55; G06F 21/577; G06F 2221/034
See application file for complete search history.

(56) References Cited

U.S. PATENT DOCUMENTS

| 7,874,000 B1 * | 1/2011 | Lal | G06F 21/55 |
| | | | 726/25 |
| 8,387,145 B2 * | 2/2013 | Xie | H04L 63/101 |
| | | | 726/25 |
| 8,677,488 B2 * | 3/2014 | Kang | H04L 41/142 |
| | | | 726/23 |
| 8,788,407 B1 * | 7/2014 | Singh | G06F 16/9535 |
| | | | 705/38 |

(Continued)

FOREIGN PATENT DOCUMENTS

| WO | 2011077013 A1 | 6/2011 |
| WO | 2014111863 A1 | 7/2014 |

OTHER PUBLICATIONS

Extended European Search Report, dated Feb. 21, 2020, 5 pages.

(Continued)

*Primary Examiner* — Zachary A. Davis
(74) *Attorney, Agent, or Firm* — ARC IP Law, PC; Joseph J. Mayo

(57) ABSTRACT

A method detects intrusions in an audit log including records of user sessions with activity features and a user label of a claimed user of the user session. Probabilities that a user session belongs to a user are predicted. A probability is predicted for each combination of a user and a user session of the audit log based on the activity features of the user sessions. A user group including users with similar activity features is constructed based on the predicted probabilities. An anomaly score for a user session of the audit log and a claimed user of the user session belonging to the user group is determined based on a probability that the user session belongs to the user group. An intrusion is detected if the anomaly score of the user session and the claimed user exceeds a predetermined threshold.

11 Claims, 3 Drawing Sheets

(56) References Cited

U.S. PATENT DOCUMENTS

| | | | |
|---|---|---|---|
| 8,869,243 B2* | 10/2014 | McGeehan | G06F 21/316 |
| | | | 726/4 |
| 9,165,299 B1* | 10/2015 | Stowe | G06F 16/355 |
| 9,384,112 B2* | 7/2016 | Petersen | G06F 11/3089 |
| 9,407,649 B2* | 8/2016 | Honda | H04L 63/1425 |
| 9,876,825 B2* | 1/2018 | Amar | H04L 63/08 |
| 9,904,893 B2 | 2/2018 | Veeramachaneni et al. | |
| 10,397,249 B2* | 8/2019 | Gurkok | H04L 63/102 |
| 11,178,168 B1* | 11/2021 | Lin | H04L 63/1433 |
| 11,483,327 B2* | 10/2022 | Hen | H04L 63/1416 |
| 2015/0067857 A1 | 3/2015 | Symons et al. | |
| 2015/0363791 A1* | 12/2015 | Raz | G06Q 30/0185 |
| | | | 705/318 |
| 2016/0065594 A1* | 3/2016 | Srivastava | H04L 63/1433 |
| | | | 726/23 |
| 2016/0203330 A1 | 7/2016 | Cecchetti et al. | |
| 2017/0339187 A1 | 11/2017 | Papamartzivanos et al. | |
| 2019/0014134 A1 | 1/2019 | Kopp et al. | |

OTHER PUBLICATIONS

German Patent Office Search Report, DE 10 2018 130 306.8, dated Sep. 4, 2019, 7 pages.

Dorothy E. Denning: An Intrusion-Detection Model, IEEE Transactions on Software Engineering, vol. SE-13, No. 2, Feb. 1987.

* cited by examiner

METHOD FOR DETECTING INTRUSIONS IN AN AUDIT LOG

CROSS-REFERENCE TO RELATED APPLICATION

This application claims the benefit of the filing date under 35 U.S.C. § 119(a)-(d) of German Patent Application No. 102018130306.8, filed on Nov. 29, 2018.

FIELD OF THE INVENTION

The present invention relates to a method for detecting intrusions and, more particularly, to a method for detecting intrusions in an audit log.

BACKGROUND

The average cost of a data breach for organizations is increasing. Therefore, intrusion detection systems become critical for organizations to ensure their security in an ever more digital environment. Intrusion detection aims at finding malicious behavior within information systems in order to permit counteraction of these behaviors in a timely manner.

There are two general approaches to intrusion detection. A first, signature-based approach relies on finding known patterns of attack. Despite good detection capabilities for known attacks, such methods cannot cope with unknown attacks. Thus, a second, anomaly-based approach is generally preferred. The anomaly-based approach assumes that malicious behavior significantly differs from the majority of observations, which are expected to represent benign activities. Due to their scarcity among all observations, the cost of collecting and labeling anomalous samples is extremely high. For this reason anomaly-based methods are usually unsupervised. However, if the assumption that intrusions are anomalies (and vice versa) does not hold, the mismatch between malicious behavior and anomalous audit records can significantly impede detection capabilities with high false negatives and/or false positives rates.

SUMMARY

A method detects intrusions in an audit log including records of user sessions with activity features and a user label of a claimed user of the user session. Probabilities that a user session belongs to a user are predicted. A probability is predicted for each combination of a user and a user session of the audit log based on the activity features of the user sessions. A user group including users with similar activity features is constructed based on the predicted probabilities. An anomaly score for a user session of the audit log and a claimed user of the user session belonging to the user group is determined based on a probability that the user session belongs to the user group. An intrusion is detected if the anomaly score of the user session and the claimed user exceeds a predetermined threshold.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
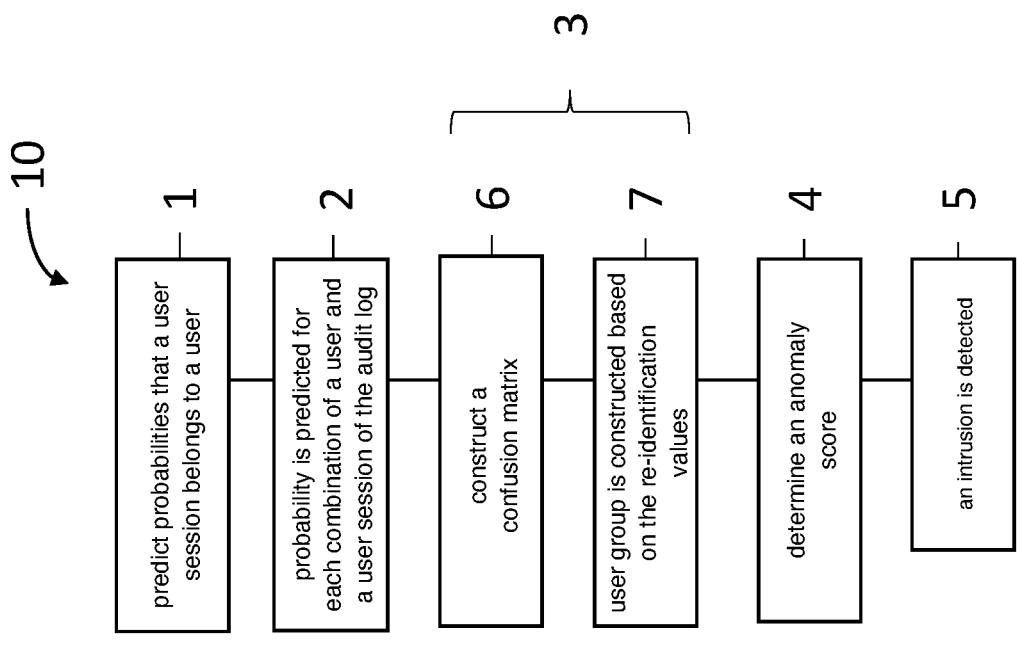
FIG. 1 is a flowchart of a method for detecting intrusions in an audit log according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

A method 10 for detecting intrusions in an audit log according to an embodiment is shown in FIG. 1.

An audit log is a security relevant dataset of electronically recorded historic events in an information technology system of an organization, e.g. a company, used to authenticate security and operational actions. An audit log comprises records of user sessions of users. Each record of a user session includes activity features and a user label of a claimed user of the user session. The user label can also be called a user ID. The activity features e.g. can include the following specifications or a group of the following specifications: start and end times of user sessions, user session lengths, number and duration of accesses to applications, number of transitions between pairs of applications, number of events per hour and a total number of events, durations since previous activities, last failed authentications, last successful authentications, number of authentications with different methods, IP addresses at authentication times and corresponding geolocations, countries of employment and boolean values indicating whether IP addresses are matching countries of employment, computer IDs, number and duration of events referring to a usage of removable devices, number of visited web pages and average durations until a next web page is visited, number of file copies to removable devices in total and per file extension, number of total emails, number of emails aggregated by receiver fields (to, cc, bcc, all), average and sum of email sizes and attachments per user session. The activity features can also include other specifications.

The method 10 determines an anomaly score quantifying an anomalousness of a user session, i.e. ideally all malicious user sessions should have higher anomaly scores than benign user sessions. The method 10 provides an unsupervised anomaly-based intrusion ranking for audit logs. By determining an anomaly score for a user session and a claimed user based on activity features it is computed to which extent user sessions of claimed users are consistent with a profile of normal behavior. The method 10 allows recognizing anomalous activity without examples of intrusions.

In a first optional step 1 of the method 10 for detecting intrusions in an audit log, shown in FIG. 1, a user identification model is trained to predict probabilities that a user session belongs to a user. The user identification model is trained to predict a probability for each combination of a user and a user session of the audit log. The prediction of the probabilities is based on the activity features of the user sessions. For the purpose of training, trained user sessions of trained audit logs are provided to the user identification model. In an embodiment, the number of trained user sessions is in the range of several hundred thousands of trained user sessions.

The user identification model can, in an embodiment, be a supervised classification model. In particular, the user identification model can be a random forest model. A random forest model is a classifier consisting of a collection of tree classifiers. In an embodiment, the evaluation of a test example is performed on each tree classifier individually and therefore is parallelizable. A random forest model can perform with high efficiency on large amounts of data. A random forest model can be trained quickly and supports a large number of different classes (users). After training, the user identification model is able to predict probabilities that a user session belongs to user. Step 1 can be omitted if the user identification model has been provided in a trained state.

In a second step 2, shown in FIG. 1, probabilities that a user session belongs to a user are predicted by the trained user identification model. A probability is predicted for each combination of a user and a user session of the audit log. Predicting the probabilities is based on the user identification model, which takes as input activity features of the user sessions.

In a third step 3, shown in FIG. 1, a user group including users with similar activity features is constructed. The user group is constructed based on the predicted probabilities. The underlying assumption is that if users are often misclassified for each other due to similar activity features, their user sessions should not be considered anomalous. Therefore, users with similar activity features are bunched together in the user group. Thus, false positives in detecting intrusions can be reduced in the presence of indistinguishable users.

Constructing the user group can, in an embodiment, be performed by a clustering method applied on confusion matrix rows, where each row represents a user. Thus, each user is represented as a vector of predicted user probabilities. In particular clustering can be performed with scikit-learn implementations of DBSCAN (Density-Based Spatial Clustering of Applications with Noise) or by hierarchical agglomerative clustering. DBSCAN is sensitive to outliers and hierarchical agglomerative clustering is a distance based method for analyzing clusters.

In a fourth step 4, shown in FIG. 1, an anomaly score for a user session of the audit log and a claimed user of the user session is determined. The user group containing the claimed user of the session is determined. The anomaly score is determined based on a probability that the user session belongs to the user group. The anomaly score of a user session s and a claimed user with user label cu of the user session s can, in an embodiment, be given by a difference between one and a probability that the user session s belongs to the user group Cc, including the claimed user cu:

$$\text{anomaly score}(s,cu)=1-\Sigma p(u|s); u \in C_{cu}$$

The probability that the user session s belongs to the user group $C_{cu}$ is a sum over all predicted probabilities p that the user session s belongs to users with user labels u of the user group $C_{cu}$. The anomaly score is dependent on user labels u. More precisely, the anomaly score is determined based on the user labels u of users belonging to the user group $C_{cu}$. The lower the probability that the user session s belongs to the user group $C_{cu}$, the more anomalous the user session s is. However, the anomaly score can also be given by another expression.

In a fifth step 5, shown in FIG. 1, an intrusion is detected if the anomaly score of the user session and the claimed user exceeds a predetermined threshold.

The method 10 can also be called a User Cluster Identification Based Intrusion Detection (UCIBID). UCIBID is a general, classifier-agnostic scheme to turn supervised user identification into unsupervised intrusion ranking for records of user session in audit logs. Compared to other state-of-the-art anomaly detection methods to convert user identification predictions into anomaly scores from user sessions, UCIBID may improve intrusion detection capabilities by reducing false positives significantly by using user groups including misidentified users obtained through clustering of the confusion matrix.

However, comparing intrusion detection methods is very difficult as they have specific operational requirements (audit logs on which they operate, type of intrusions to detect, performance metrics for evaluation). Known solutions in the domain of user-centric intrusion detection usually build one profile of normal behavior per user, then use some similarity measure to assess the normality of new user sessions compared to the existing profile. The specificity of intrusion detection systems is such that existing methods cannot be straightforwardly adapted to new audit logs comprising new activity features.

A simple and comparable method may, for example, be a User Identification Based Intrusion Detection (UIBID) where an anomaly score is given by $$\text{anomaly score}(s,cu)=1-p(cu|s).$$

UIBID may retrieve false positives because each session which cannot be attributed to its user will get a high anomaly score. In contrast, UCIBID leverages similarities in user activities. Thus, false positives can be reduced compared to UIBID. The efficiency of UCIBID can be characterized by an area under a precision-recall curve (AUPRC). Precision is defined as the number of true positives over the number of true positives plus the number of false positives. Recall is defined as the number of true positives over the number of true positives plus the number of false negatives. The larger the AUPRC, the better is the efficiency of the method.

UCIBID can significantly improve masquerade detection or insider threat detection. A masquerade intrusion consists in a user account being used by someone else, usually without the legitimate user's consent, possibly after a theft of credentials. The masquerader can be internal or external to the organization. Insider threats represent a different attack scenario, where a rightfully authorized user conducts malicious activities, potentially harmful to the organization. UCIBID can significantly outperform other methods regarding masquerade detection scenarios where users with indistinguishable activities are present. A user session which cannot be attributed to its user is not necessarily interpreted to be anomalous.

Constructing the user group in the third step 3 can, in the embodiment shown in FIG. 1, include two sub steps 6, 7.

In a first sub step 6, a confusion matrix comprising re-identification values based on the predicted probabilities and the user labels of the users is constructed. The re-identification values which are entries of a main diagonal of the confusion matrix indicate user sessions of claimed users reattributed to the respective claimed users. Re-identification values which are off-diagonal entries of the confusion matrix indicate user sessions of claimed users reattributed to other users.

In a second sub step 7, the user group is constructed based on the re-identification values such that the user group comprises at least a first user and further users which have been misclassified for the first user for at least a predetermined number of user sessions of the audit log. In particular, the similarity threshold is automatically and implicitly determined by the clustering method.

A process for constructing user groups 11 from a confusion matrix 12 is shown and described with reference to FIG. 2. In an exemplary embodiment, the confusion matrix 12 is shown for six users labeled with letters A, B, C, D, E, F. The confusion matrix 12 includes entries 14 which are re-identification values based on the predicted probabilities in the second step 2. The entries 14 are depicted as boxes in FIG. 2. Each row of the confusion matrix 12 represents re-identification values of one claimed user 8. Thus, each row of the confusion matrix 12 can be used as a vectorial representation of the corresponding claimed user 8. Each column of the confusion matrix 12 represents re-identification values of one predicted user 9.

Figure 2:
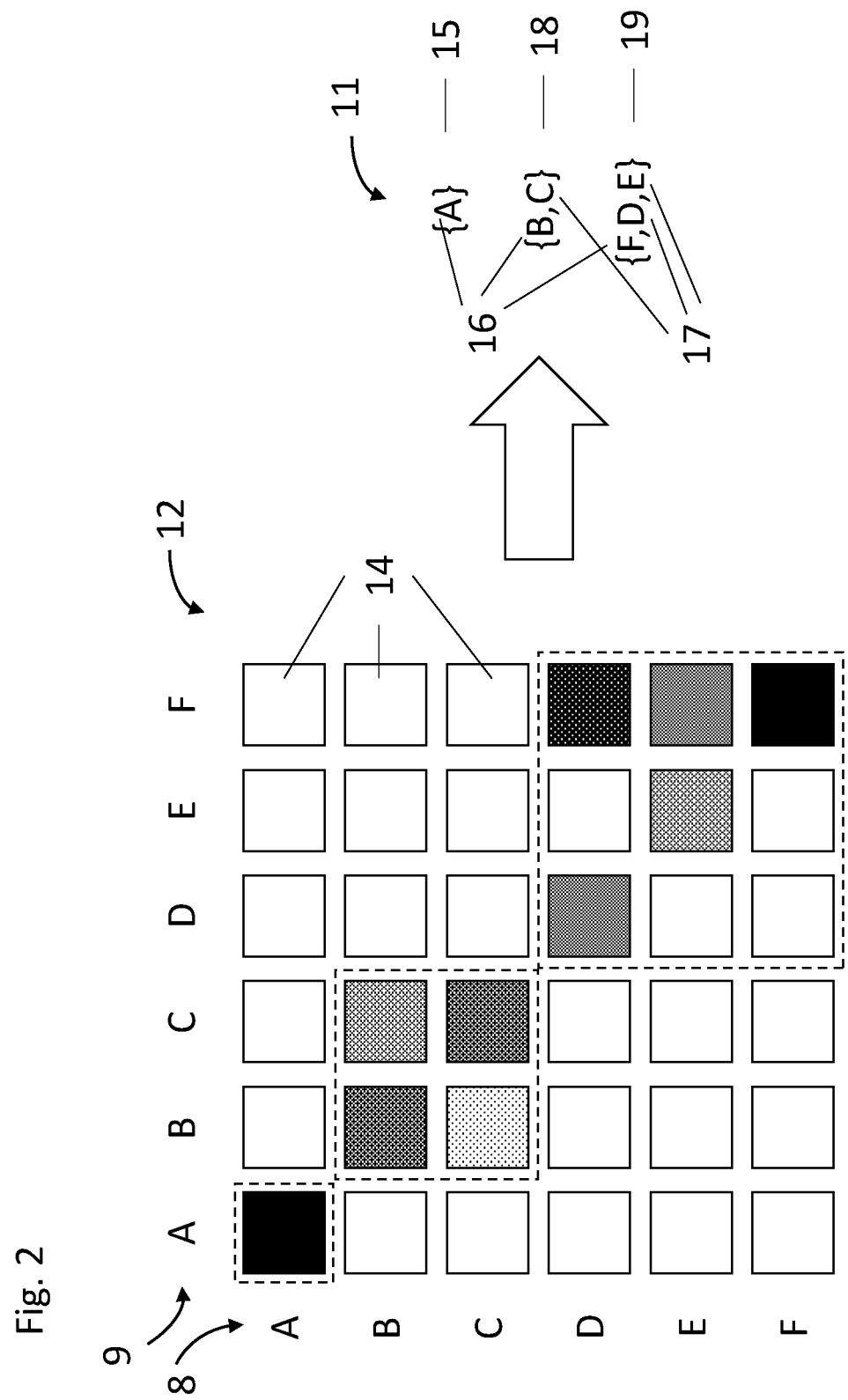
FIG. 2 is a schematic diagram of a process for constructing user groups from a confusion matrix.

The re-identification values which are entries 14 of the main diagonal of the confusion matrix 12, shown in FIG. 2, indicate user sessions of claimed users 8 reattributed to the respective claimed users 8, i.e. for the diagonal entries 14 a predicted user 9 corresponds to a claimed user 8. Re-identification values which are off-diagonal entries 14 of the confusion matrix indicate user sessions of claimed users 8 reattributed to other users, i.e. a predicted user 9 does not correspond to claimed user 8.

For example, in FIG. 2, all user sessions of claimed user A have been reattributed to user A and no user session of claimed user A has been reattributed to another user B, C, D, E, F. Also, all user sessions of claimed user F have been reattributed to user F and no user session of claimed user F has been reattributed to another user A, B, C, D, E. If all user sessions of a claimed user 8 are reattributed to the claimed user 8, it is indicated by a black box in FIG. 2. If no user session of a claimed user 8 is reattributed to another user, it is indicated by a white box in FIG. 2. The darker a box appears in FIG. 2, the more user sessions of a claimed user 8 have been reattributed to another user. E.g., some user sessions of claimed user B are reattributed to user C and some user sessions of claimed user C are reattributed to user B. Users B and C have been misclassified for each other due to similar activity features. Also, some user sessions of claimed user D are reattributed to user F and some user sessions of claimed user E are reattributed to user F, too. Users D and E have been misclassified for user F due to similar activity features.

User groups 11, shown in FIG. 2, are constructed based on the re-identification values such that the user groups 11 include at least a first user 16 and further users 17 which have been misclassified for the first user 16 for at least a predetermined number of user sessions of the audit log. A first user group 15 includes only the first user 16, which is user A. The first user group 15 does not comprise any further users 17 as no other user has been misclassified for the first user 16. A second user group 18 includes users B and C. In this case, user B or user C can be the first user 16 as both have been misclassified for each other. If user B is chosen as the first user 16, user C is the further user 17 and vice versa. A third group 19 includes users D, E and F. In this case, user F is the first user 16 and users D and E are the further users, as users D and E have been misclassified for user F.

An anomaly score for a user session s and claimed user A is given by anomaly score$(s,A)=1-p(A|s)$.

An anomaly score for a user session s and claimed user B is given by anomaly score$(s,B)=1-p(B|s)-p(C|s)$ and equals the anomaly score for a user session s and claimed user C anomaly score$(s,C)=1-p(B|s)-p(C|s)$ =anomaly score$(s,B)$.

An anomaly score for a user session s and claimed user F is given by anomaly score$(s,F)=1-p(D|s)-p(E|s)-p(F|s)$, wherein anomaly score$(s,F)$=anomaly score$(s,D)$ =anomaly score$(s,E)$.

Figure 3:
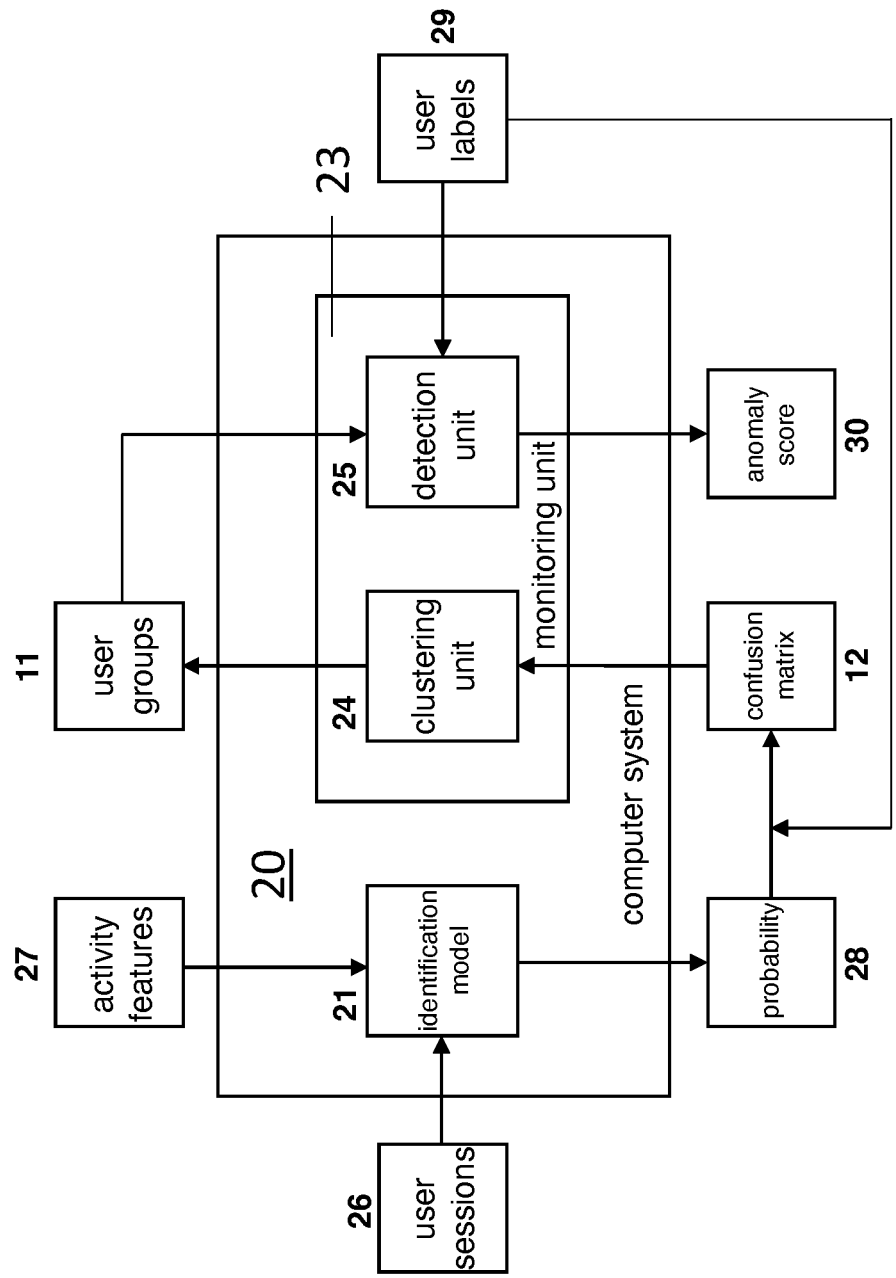
FIG. 3 is a block diagram of a computer system performing the method for detecting intrusions in the audit log.

A computer system 20 shown in FIG. 3 is capable of performing the method 10 of FIG. 1.

The computer system 20, as shown in FIG. 3, includes a monitoring unit 23 designed to detect intrusions in an audit log. The monitoring unit 23 includes a clustering unit 24 and a detection unit 25. The detection unit 25 of the monitoring unit 23 is designed to detect intrusions in an audit log. FIG. 3 exemplary shows that the user identification model 21 is part of the computer system 20. However, the user identification model 21 does not necessarily have to be a part of the computer system 20. In contrast to the depiction of FIG. 3, the user identification model 21 can also be a part of the monitoring unit 23.

In the first optional step 1 of the method 10, the user identification model 21 shown in FIG. 3 is trained to predict probabilities 28 that a user session belongs to a user. For the purpose of the training of the user identification model 21, train user sessions 26 of train audit logs are provided to the user identification model 21.

In the second step 2, probabilities 28 that a user session belongs to a user are predicted by the trained user identification model 21. A probability 28 is predicted for each combination of a user and a user session of the audit log by the trained user identification model 21 based on the activity features 27 of the user sessions.

In the third step 3, the user groups 11 including users with similar activity features is constructed. The user groups 11 can e.g. be constructed from the confusion matrix 12 shown in FIG. 2. The confusion matrix 12 is constructed based on the predicted probabilities 28 and the user labels 29 shown in FIG. 3. The clustering unit 24 of the monitoring unit 23 is designed to construct the user groups 11 including users with similar activity features based on the confusion matrix 12. The confusion matrix 12 can be constructed by the user identification model 21 or by a processing unit of the computer system 20.

In the fourth step 4, the anomaly score 30 for a user session of the audit log and a claimed user of the user session is determined by the detection unit 25 of the monitoring unit 23, as shown in FIG. 3. The claimed user belongs to the user group 11. The anomaly score 30 is determined by the detection unit 25 based on a probability that the user session belongs to the user group 11 and the user labels 29 of users of the user group 11. The detection unit 25 is designed to detect an intrusion if the anomaly score 30 exceeds a predetermined threshold.

The method 10 and computer system 20 implementing the method 10 allow the detection of intrusions in an audit log and, consequently, data breaches can be prevented. Sensitive data recorded in an audit log can also be used to attack a network of an organization. Therefore, the method 10 can contribute to ensure a security of sensitive data and network operation, and costs resulting from intrusions can be reduced. The method 10 detects masquerade intrusions and insider threats and can significantly outperform state-of-the-art methods regarding masquerade intrusions and insider threat scenarios especially including a massive and anomalous email activity.

What is claimed is:

1. A method for detecting intrusions in an audit log, wherein the audit log includes a plurality of records of a plurality of user sessions of a plurality of users, each record of a user session of the plurality of user sessions includes a plurality of activity features and a user label of a claimed user of the plurality of users of a user session of the plurality of user sessions of said each record of the plurality of records, the method comprising:

training a user identification model to predict probabilities that a first user session of the plurality of user sessions belongs to the claimed user of the plurality of users,
wherein trained user sessions of trained audit logs are provided to the user identification model;

predicting, via said user identification model that is trained, a plurality of probabilities that the first user session belongs to the claimed user of the plurality of users,
wherein a probability of the plurality of probabilities is predicted for each combination of the claimed user and the first user session of the audit log, such that there as many probabilities as there are user to user session combinations,
wherein said predicting the plurality of probabilities is based on the user identification model, wherein the user identification model takes as input the plurality of activity features of the plurality of user sessions;

constructing a user group including users with similar activity features of said plurality of activity features, wherein the user group is constructed based on the plurality of probabilities that are predicted,
wherein said constructing said user group is performed by a clustering method applied on a confusion matrix with confusion matrix rows, wherein each row of said confusion matrix rows represents each user of said plurality of users, such that said each user is represented as a vector of predicted user probabilities,
wherein said clustering method is performed:
with scikit-learn implementations of Density-Based Spatial Clustering of Applications with Noise (DBSCAN) or
by hierarchical agglomerative clustering,
wherein said users with said similar activity features are grouped together in the user group based on a similarity threshold to reduce false positives in a presence of indistinguishable users when detecting said intrusions using User Cluster Identification Based Intrusion Detection (UCIBID), such that each user session of said plurality of user sessions which cannot be attributed to an associated user is not interpreted to be anomalous;
wherein said UCIBID is a classifier-agnostic scheme to turn supervised user identification into unsupervised intrusion ranking;
wherein said UCIBID leverages similarities in user activities of said plurality of users,
wherein an efficiency of UCIBID is characterized by an area under a precision-recall curve (AUPRC), such that:
a precision of said AUPRC is defined as a number of true positives divided by the sum of the number of true positives plus a number of said false positives, and
a recall is defined as the number of true positives divided by the sum of the number of true positives plus a number of false negatives,
wherein said similarity threshold is automatically determined by said clustering method;

determining an anomaly score for the first user session of the plurality of user sessions of the audit log and the claimed user of the first user session,
wherein the claimed user belongs to the user group,
wherein the anomaly score is determined based on a probability that the first user session belongs to the user group,
wherein said users with said similar activity features that are grouped together in the user group are not considered anomalous,
wherein the probability that the first user session belongs to the user group is a sum over all predictions of the plurality of probabilities that the first user session belongs to the user group,
wherein the lower the probability that the first user session belongs to the user group, the more anomalous the first user session is;

detecting an intrusion if the anomaly score of the first user session and the claimed user exceeds a predetermined threshold to reduce said false positives in the presence of said indistinguishable users through said clustering of the confusion matrix; and providing an unsupervised anomaly-based intrusion ranking for said plurality of user sessions in said audit log using said UCIBID.

2. The method of claim 1, wherein said confusion matrix further includes a plurality of re-identification values based on the plurality of probabilities that are predicted.

3. The method of claim 2, wherein, in the confusion matrix, said plurality of re-identification values comprises:
first re-identification values that are entries of a main diagonal of the confusion matrix and that indicate that said plurality of user sessions are reattributed to claimed users of said plurality of user sessions respectively, and
second re-identification values which are off-diagonal entries of the confusion matrix and that indicate that the plurality of user sessions are reattributed to other users that are different than said claimed users.

4. The method of claim 3, wherein the user group is constructed based on the first re-identification values and the second re-identification values such that the user group includes at least a first user and further users which have been misclassified as the first user for at least a predetermined number of user sessions of the audit log.

5. The method of claim 1, wherein the anomaly score is given by a difference between one and the probability that the first user session of said plurality of user sessions belongs to the user group.

6. The method of claim 1, wherein the user identification model is a supervised classification model.

7. The method of claim 6, wherein the user identification model is a random forest model.

8. The method of claim 1, wherein the anomaly score is represented by the equation:

$$\text{anomaly score}(s, cu) = 1 - \Sigma p(u|s); u \in C_{cu}$$

wherein:

s is the first user session,
u is a user of the plurality of users,
cu is the claimed user of the first user session, and
$C_{cu}$ is the user group.

9. A computer system, comprising:
a monitoring unit comprising:
- a detection unit configured to detect intrusions in an audit log, wherein the audit log includes a plurality of records of a plurality of user sessions of a plurality of users, each record of a user session of the plurality of user sessions includes a plurality of activity features and a user label of a claimed user of the plurality of users of a user session of the plurality of user sessions, and
- a clustering unit configured to construct a user group including users with similar activity features; and
a user identification model that is trained to predict probabilities that a first user session of the plurality of user sessions belongs to the claimed user of the plurality of users,
  - wherein trained user sessions of trained audit logs are provided to the user identification model to train said user identification model;
wherein said user identification model is configured to predict a plurality of probabilities that the first user session belongs to the claimed user of the plurality of users,
  - wherein a probability of said plurality of probabilities is predicted for each combination of the claimed user and the first user session of the plurality of user sessions of the audit log, such that there as many probabilities as there are user to user session combinations,
  - wherein said predicting the plurality of probabilities is based on the user identification model, wherein the user identification model takes as input the plurality of activity features of the plurality of user sessions;
wherein said clustering unit is configured to construct said user group including said users with said similar activity features of said plurality of activity features based on the plurality of probabilities that are predicted,
  - wherein said constructing said user group is performed by a clustering method applied on a confusion matrix with confusion matrix rows, wherein each row of said confusion matrix rows represents each user of said plurality of users, such that said each user is represented as a vector of predicted user probabilities,
  - wherein said clustering method is performed:
    - with scikit-learn implementations of Density-Based Spatial Clustering of Applications with Noise (DBSCAN) or
    - by hierarchical agglomerative clustering;
wherein said users with said similar activity features are grouped together in the user group based on a similarity threshold to reduce false positives in a presence of indistinguishable users when detecting said intrusions using User Cluster Identification Based Intrusion Detection (UCIBID), such that each user session of said plurality of user sessions which cannot be attributed to an associated user is not interpreted to be anomalous;
  - wherein said UCIBID is a classifier-agnostic scheme to turn supervised user identification into unsupervised intrusion ranking;
  - wherein said UCIBID leverages similarities in user activities of said plurality of users,
  - wherein an efficiency of UCIBID is characterized by an area under a precision-recall curve (AUPRC), such that:
    - a precision of said AUPRC is defined as a number of true positives divided by the sum of the number of true positives plus a number of said false positives, and
    - a recall is defined as the number of true positives divided by the sum of the number of true positives plus a number of false negatives,
  - wherein said similarity threshold is automatically determined by said clustering method;
wherein the detection unit is further configured to:
  - determine an anomaly score for the first user session of the plurality of user sessions of the audit log and the claimed user of the first user session of the plurality of user sessions,
    - wherein the claimed user belongs to the user group,
    - wherein the anomaly score is determined based on a probability that the first user session of the plurality of user sessions belongs to the user group,
    - wherein said users with said similar activity features that are grouped together in the user group are not considered anomalous;
  - detect an intrusion if the anomaly score of the first user session and the claimed user exceeds a predetermined threshold to reduce said false positives in the presence of said indistinguishable users through said clustering of the confusion matrix; and
  - provide an unsupervised intrusion ranking for said plurality of user sessions in said audit log using said UCIBID.

10. The computer system of claim 9, wherein the probability that the first user session of the plurality of user sessions belongs to the user group is a sum over all predictions of the plurality of probabilities that are predicted that the first user session of the plurality of user sessions belongs to the user group, and wherein the lower the probability that the first user session of the plurality of user sessions belongs to the user group, the more anomalous the first user session is.

11. The computer system of claim 9, wherein the anomaly score is represented by the equation:

anomaly score$(s, cu) = 1 - \Sigma p(u|s); u \in C_{cu}$ wherein:
s is the first user session,
u is a user of the plurality of users of the first user session of the plurality of user sessions,
cu is the claimed user of the first user session, and
$C_{cu}$ is the user group.

* * * * *